United States Patent [19]
Watanabe et al.

[11] 4,177,119
[45] Dec. 4, 1979

[54] PROCESS FOR RECOVERY OF WASTE $H_2SO_4$ AND HCl

[75] Inventors: Morio Watanabe, Amagasaki; Sanji Nishimura, Kyoto, both of Japan

[73] Assignee: Solex Research Corporation, Osaka, Japan

[21] Appl. No.: 936,595

[22] Filed: Aug. 24, 1978

Related U.S. Application Data

[63] Continuation of Ser. No. 773,657, Mar. 2, 1977, Pat. No. 4,113,588.

[30] Foreign Application Priority Data

| Mar. 9, 1976 | [JP] | Japan | 51/25223 |
| Mar. 25, 1976 | [JP] | Japan | 51/33029 |
| Oct. 4, 1976 | [JP] | Japan | 51/118598 |

[51] Int. Cl.$^2$ .................................................. C25B 1/22
[52] U.S. Cl. ......................................... 204/151; 204/103; 204/104; 204/149; 204/180 P; 423/139; 423/DIG. 14
[58] Field of Search ............... 204/151, 103, 104, 149, 204/180 P; 423/139, DIG. 14

[56] References Cited

U.S. PATENT DOCUMENTS

| 1,954,664 | 4/1934 | Cain | 204/130 X |
| 2,748,071 | 5/1956 | Eisler | 204/104 X |
| 3,764,503 | 10/1973 | Lancy et al. | 204/180 P |
| 3,788,915 | 1/1974 | Gulla | 204/149 X |
| 3,788,959 | 1/1974 | Smith | 204/180 P |
| 3,795,727 | 3/1974 | Yamamura et al. | 423/139 X |
| 3,923,081 | 7/1974 | Treharne et al. | 204/151 |
| 3,969,207 | 7/1976 | Kerti et al. | 204/151 X |
| 4,008,134 | 2/1977 | Thorsen | 423/139 X |
| 4,016,054 | 4/1977 | Gandon et al. | 423/139 X |

Primary Examiner—Arthur C. Prescott
Attorney, Agent, or Firm—Toren, McGeady and Stanger

[57] ABSTRACT

This invention relates to a process for recovery of waste $H_2SO_4$ and HCl which are used for pickling metallic materials and articles and contain a large quantities of Fe ions. Furthermore, it offers a process for the recovery of $H_2SO_4$ and HCl from waste $H_2SO_4$ which contains large amounts of Fe ions after removal of Ti ions by a hydrolysis process in the production of $TiO_2$ and also for the recovery of high-purity electrolytic iron or iron hydroxide.

12 Claims, 15 Drawing Figures

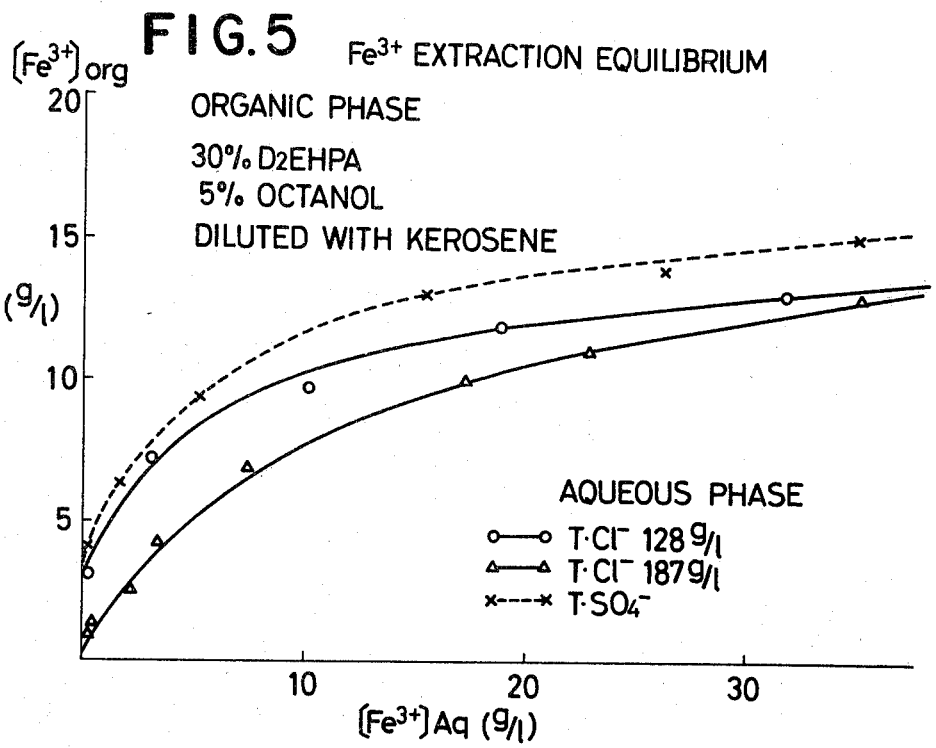
FIG. 5 — $Fe^{3+}$ EXTRACTION EQUILIBRIUM
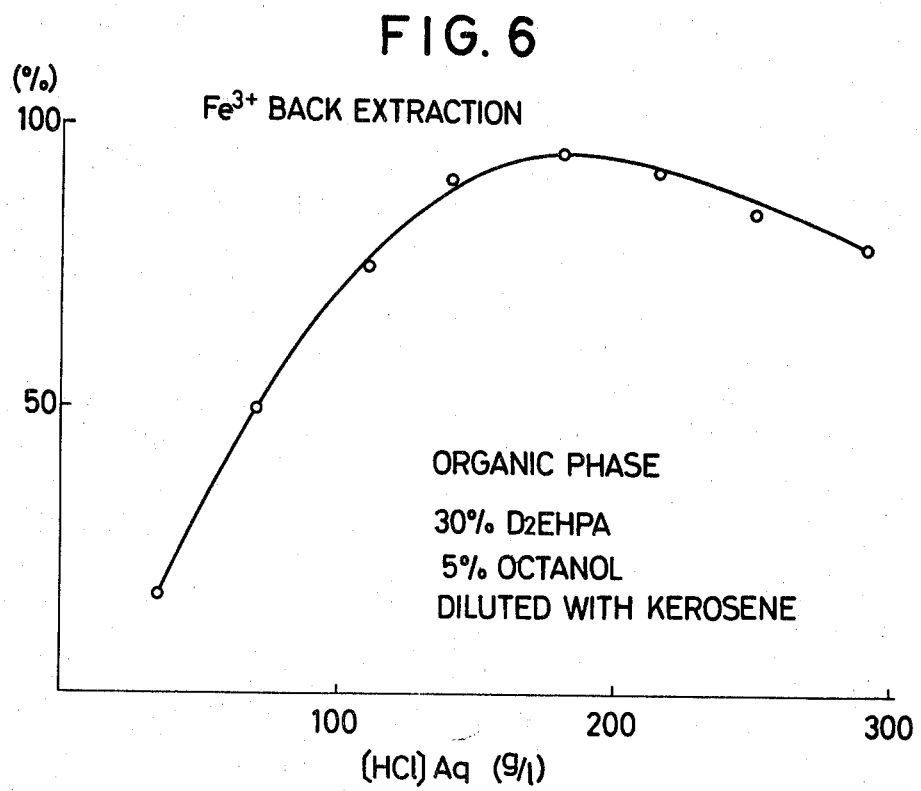
FIG. 6 — $Fe^{3+}$ BACK EXTRACTION

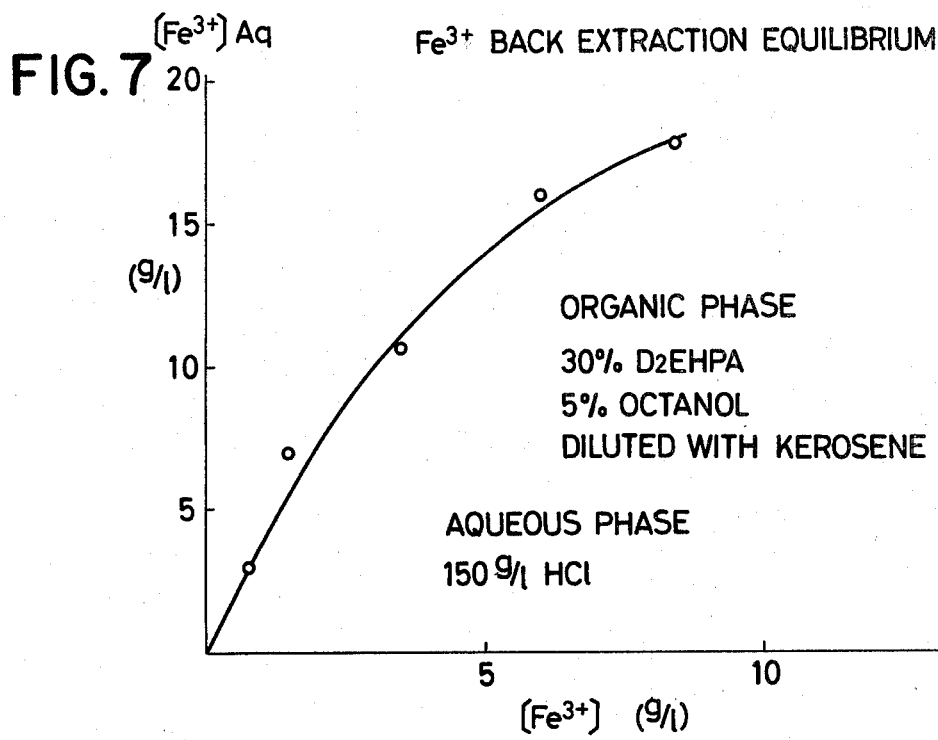
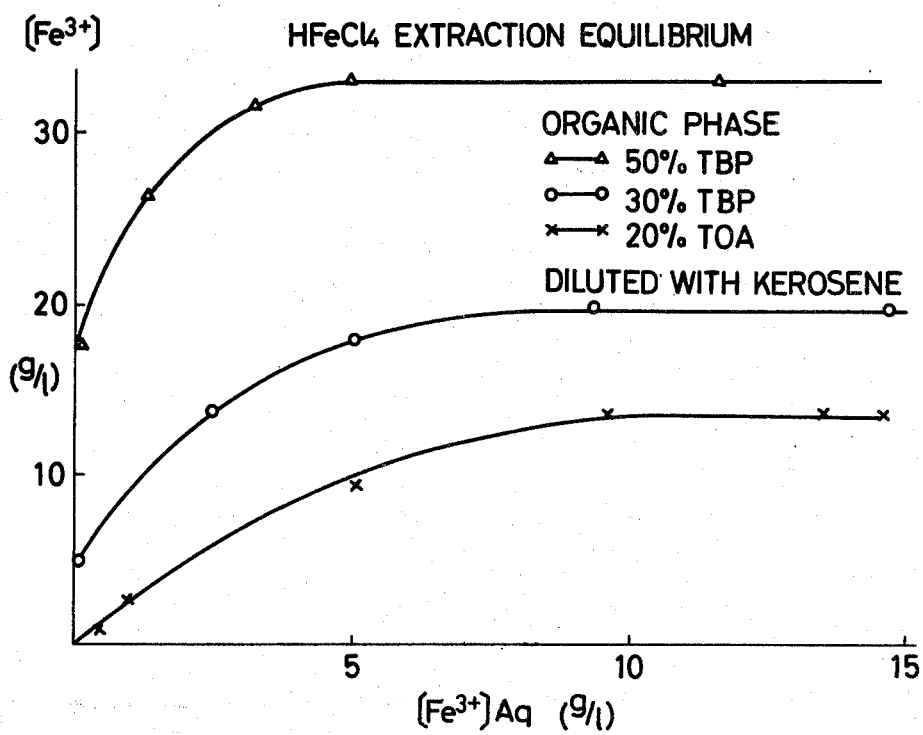

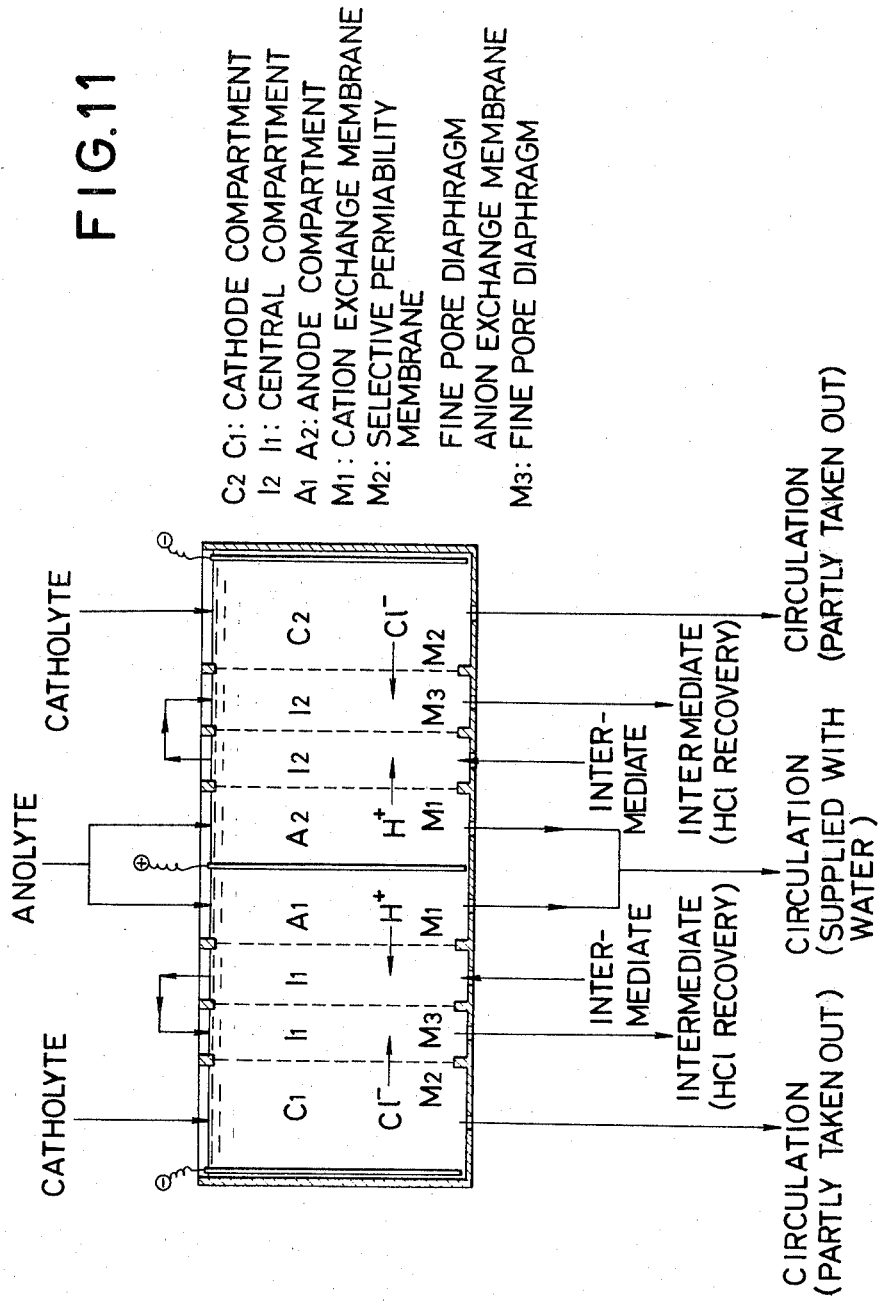

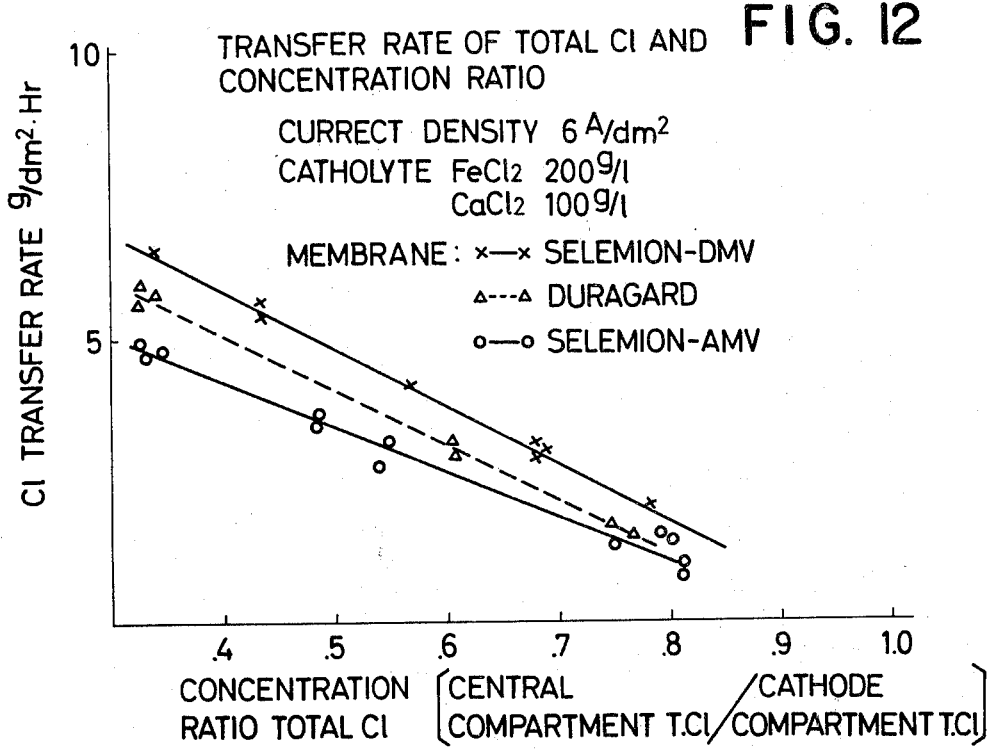
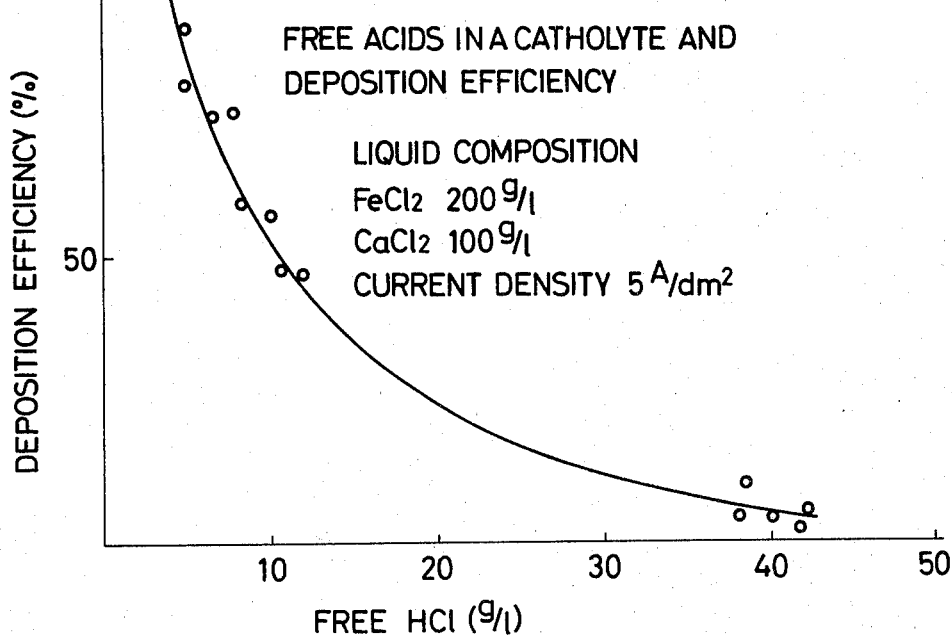

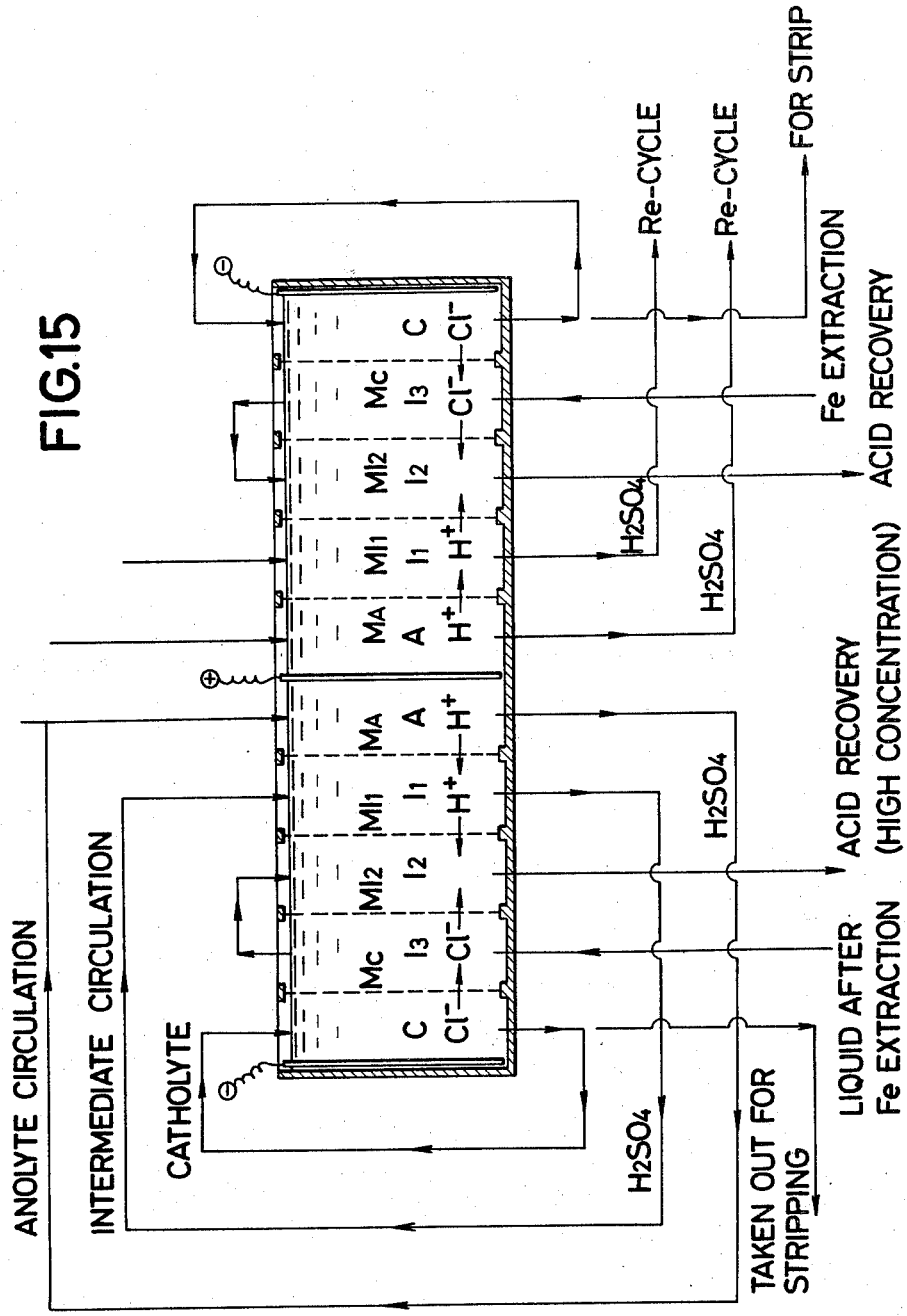

PROCESS FOR RECOVERY OF WASTE $H_2SO_4$ AND HCl

This is a continuation of application Ser. No. 773,657, filed Mar. 2, 1977 now U.S. Pat. No. 4,113,588.

BACKGROUND OF THE INVENTION

This invention relates to a process for recovery of waste $H_2SO_4$ and HCl which are used for pickling metallic materials and articles and contain a large quantities of Fe ions. Furthermore, it offers a process for recovery $H_2SO_4$ and HCl from waste $H_2SO_4$ which contains a large amounts of Fe ions after removal of Ti ions by a hydrolysis process in the production of $TiO_2$ and also the recovery of high-purity electrolytic iron or iron hydroxide.

There are two conventional methods of acid recovery. The first method is a crystallization method which crystallizes Fe ions contained as their sulfate or chloride salt by cooling or concentrating waste acids with heat. However, this method has the following disadvantages: (1) large amounts of energy are required for the crystallization; (2) the removal of heavy metallic ions, such as, Fe ions from the waste acids is difficult; (3) an economical method for treating the crystals removed is not available.

The second method is a thermal decomposition method which sprays the waste acids, including Fe ions, into a furnace heated from 600° to 1000° C. The HCl or $H_2SO_4$ is recovered by absorbing the gases decomposed into the forms of HCl gas, $Cl_2$ gas and $Fe_2O_3$ or the forms of $H_2SO_4$ gas, $SO_2$ gas, $SO_3$ gas and $Fe_2O_3$, and these are reused for pickling and dissolution of raw materials. The following disadvantages are found in this method. (1) a large energy loss for thermal decomposition in the case of lower Fe ions concentration in the waste acids; (2) an abundant hydrochloric acid loss as HCl fume unless the total $Cl^-$ ions concentration in the pickling process is increased; (3) beating of the pickling solution required to raise the Fe ions concentration in it; (4) difficulty in controlling the Fe concentration in practice, and (5) a low operating rate and high maintenance cost based on severe damage of the apparatus by wet $Cl_2$ and HCl gases.

Moreover, many methods which recover HCl or $H_2SO_4$ by removal of Fe ions in the waste acids as electrolytic iron by electrolysis have been published. These methods introduce the waste HCl or $H_2SO_4$ including abundant Fe ions into the cathode compartment in electrolysis process, electrodeposits of Fe metal on the cathode, and at the same time transfer $Cl^-$ or $SO_4^{2-}$ ions through the anion exchange membrane which divides the cathode and central compartments, and recycle the waste acids which having passed the cathode compartment into the used parts through the central compartment. Abundant free acids in the waste acid in the electrolysis process yield a low Fe electrolysis efficiency, because of the decomposition to $H^+$ and $Cl^-$ ions or $H^+$ and $SO_4^{2-}$ ions (see FIG. 14).

To overcome this disadvantage, the conventional method has proposed to set the diffusion-dialysis membrane prior to the electrolysis process and decrease the amounts of free acid as possible. However, the above method can not improve the relationship of the increasing amounts of free acid attended by electrodeposition of Fe metals due to the direct electrolysis. Furthermore, since the waste acids often contain the heavy metallic ions except Fe ions, only a poor-purity electrolytic iron is obtained in the electrolysis process and consequently high additional valuable materials can not be obtained.

SUMMARY OF THE INVENTION

The present invention has overcome the disadvantages of the conventional process described above and relates to a process for treating waste $H_2SO_4$ or HCl containing a large amounts of Fe ions and particularly obtaining reusable $H_2SO_4$ or HCl and high-purity electrolytic iron or iron hydroxide using both solvent extraction and diaphragm-electrolysis techniques. In general, since most of Fe ions contained in the waste acids are present as $Fe^{2+}$ ions, the oxidation method of $Fe^{2+}$ ions to $Fe^{3+}$ ions with high pressured air or oxygen, or $H_2O$ is often used.

This invention comprises the following sequential steps:

(1) The first step in which the waste acids containing $Fe^{2+}$ ions are introduced into the anode compartment, a solution containing $Fe^{3+}$ ions are passed through the cathode compartment divided with diaphragms, and the oxidation-reduction cell is constructed by connecting the electrodes set in both compartments with a wire and $Fe^{2+}$ ions in the waste acids are converted to $Fe^{3+}$ ions.

(2) The second step in which $Fe^{3+}$ ions in the resultant aqueous solution from the first step are extracted with contact of an organic solvent (A) selected from di-alkyl phosphoric acids, for example, D2EHPA (Di-2-ethyl hexyl phosphoric acid) or HDBP (Mono-dodecyl phosphoric acid).

(3) The aqueous solution from the second step in which Fe ions are diminished is recycled to the using parts.

(4) The organic solvent (A) is regenerated by stripping $Fe^{3+}$ ions extracted into the organic solvent (A) in the second step by contact with HCl.

(5) The third step in which $Fe^{3+}$ ions transferred into HCl strip solution are extracted into the organic phase as ferric chloride complex with contact of an organic solvent (B) containing a phosphoric acid ester or a primary, secondary, tertiary or quarternary amine.

(6) The strip solution in which total $Cl^-$ ions concentration was decreased due to the extraction as ferric chloride complex is introduced into the central compartment of an electro-bath in a fourth step. Then hydrochloric acid is recovered from $Cl^-$ and $H^+$ ions transferred through the diaphragms and recycled for stripping the organic solvent (A).

(7) The ferric chloride complex extracted into the organic solvent (B) is stripped from the organic solvent (B) with contact of water or one part of catholyte in the electro-bath for Fe recovery in the fourth step. Consequently the organic solvent (B) is regenerated and recycled to extract the ferric chloride complex in the third step.

(8) The solution containing $Fe^{3+}$ ions stripped into water or catholyte in the third step is introduced into the cathode compartment in the first step. The oxidation-reduction cell is constructed between the above solution in the cathode compartment and the waste acid in the anode compartment containing $Fe^{2+}$ ions by connecting the electrodes set in both compartments with wire and $Fe^{3+}$ ions in the strip solution are reduced to $Fe^{2+}$ ions. If necessary, an outer cell can be connected in order to conduct completely oxidation-reduction and promote the transfer of free acid produced in the reduction process.

(9) If there are a large quantities of free acid in the aqueous solution reduced to $Fe^{2+}$ ions in the first step, the free acid is diminished by diffusion- or electro-dialysis method in the dialysis process and supplied to the cathode compartment of electro-bath for Fe recovery.

(10) $CaCl_2$ or $NH_4Cl$ except $FeCl_2$ is added into the catholyte circulating the cathode compartment in the fourth step owing to the promotion of electrolysis efficiency and the total $Cl^-$ ions concentration in the catholyte is always maintained higher than one in the solution passed through the central compartment.

(11) The anolyte circulating the anode compartment in the fourth step contains 100–400 g/l $H_2SO_4$ and feeds $H^+$ ions to the central compartment.

(12) A conventional porous fine pore membrane, diffusion-dialysis membrane or anion exchange membrane is usable for the diaphragm between cathode and central compartments. While, the diaphragm between anode and central compartments comprises a cation exchange membrane.

(13) To increase total $Cl^-$ ions concentration in the solution passing through the central compartment, more diaphragms of porous fine pore membrane are used to prevent the decrease of selectivity of the cation exchange membrane.

(14) This invention is characterized with the two following recovery methods for $H_2SO_4$ or HCl containing Fe ions.

The first character consists of the recovery of Fe hydroxide and $Cl^-$ ions in which $Fe^{2+}$ ions in one part of catholyte drawn off are oxidized to $Fe^{3+}$ ions by contact of air or oxygen, iron hydroxides produced in the above process are filtered off and the filtrate is reused for the cathode compartment or strip solution in the third step.

The second character consists of the recovery of high-purity electrolytic iron deposited on the cathode and $Cl^-$ ions by transferring them into the central compartment.

(15) A modification of this invention comprises the following steps:

The first step in which a waste HCl containing high total $Cl^-$ ions concentration and abundant Fe ions is introduced into the anode compartment divided with diaphragm, an oxidation reduction cell is constructed by connecting the electrodes set in the anode compartment and the cathode compartment in which a solution containing a large amounts of $Fe^{3+}$ ions passes with wire and $Fe^{2+}$ ions in the solution introduced into the anode compartment are oxidized to $Fe^{3+}$ ions.

(16) The second step in which $Fe^{3+}$ ions in the resultant aqueous solution from the first step are extracted into the organic phase as ferric chloride complex with contact of an organic solvent (C) containing a phosphoric acid ester or a primary, secondary, tertiary or quarternary amine.

(17) The raffinate from the second step is introduced into the central compartment in the diaphragm-electrobath for Fe recovery in the third step and hydrochloric acid is recovered by $Cl^-$ and $H^+$ ions transferred through the diaphragms and recycled to the reusing process.

(18) The organic solvent (C) extracted ferric chloride complex in the second step is stripped with contact of water or one part of catholyte in the electrolysis process for Fe recovery in the third step and regenerated.

(19) The said strip solution containing $Fe^{3+}$ ions is introduced into the cathode compartment in the first step, an oxidation-reduction cell is constructed between the said strip containing $Fe^{2+}$ ions solution in the cathode compartment and the waste acid in the anode compartment divided with diaphragm by connecting cathode and anode with wire and the $Fe^{3+}$ ions in the said strip solution are converted to $Fe^{2+}$ ions.

(20) An outer cell can be connected to promote the transfer of free acid produced by the reduction of $Fe^{3+}$ ions into the anode compartment through the diaphragm.

(21) The aqueous solution containing the $Fe^{2+}$ ions by being reduced is fed into the cathode compartment in electro-bath for Fe recovery in the third step. High-purity electrolytic iron is obtained in proceeding of electrolysis in the cathode compartment and $Cl^-$ ions produced at the same time are recovered by transferring them into the central compartment through the diaphragm.

(22) $Fe^{2+}$ ions in one part of catholyte taken off are oxidized to $Fe^{3+}$ ions with contact of air or oxygen. Fe hydroxide produced in the above process is filtered off and the resultant filtrate is recycled to the cathode compartment or reused for the strip solution in the second step.

As described above, this invention offers the recovery method of acid containing Fe ions with the character which high-purity electrolytic iron or Fe hydroxide is obtained and reusable HCl or $H_2SO_4$ is recovered at the same time.

The following advantages may be obtained in practice of this invention.

(1) The choice of apparatus materials is very easy by means of the operation of whole apparatus at room temperature and even heating in the pickling process is unnecessary.

(2) In use in the pickling process the HCl loss as its fume is diminished by capable lowering total $Cl^-$ ions concentration in the aqueous solution and consequently the inferiority of environment can be prevented.

(3) The enhancement of economical value based on capable closed-circuit, non-pollution and production of additional valuable high-purity electrolytic iron and iron hydroxide.

(4) The low labor cost based on easy operation control of apparatus and capable automatic operation.

(5) The low maintenance cost based on rare accident by means of few movable parts of apparatus and high operating rate of apparatus.

(6) Little limitation of apparatus scale, capable manufacture of equipments from large capacity to small capacity and easy stepwise development.

DETAILED DESCRIPTION OF THE INVENTION

The present invention will now be described, through only by way of illustration, in the following Example which shows preferred aspects of the invention, by reference to the accompanying drawings.

BRIEF DESCRIPTION OF THE DRAWINGS

FIG. 5 is a graph showing the extraction equilibrium curve of $Fe^{3+}$ ions in HCl solution with D2EHPA;

FIG. 6 is a graph showing the relation between stripping coefficient of $Fe^{3+}$ ions extracted with D2EHPA and HCl concentration;

FIG. 7 is a graph showing the back-extraction equilibrium curve of $Fe^{3+}$ ions extracted with D2EHPA;

FIG. 8 is a graph showing the $HFeCl_4$ extraction equilibrium curve with TBP (Tri-butyl phosphate) or TOP (Tri-octyl phosphate);

FIG. 11 is a graph showing the electro-bath for iron recovery (4 baths);

FIG. 12 is a graph showing the relation between transferred amounts of $Cl^-$ ions in the iron electrolysis process and difference of total $Cl^-$ ions concentration;

FIG. 13 is a graph showing the relation between amounts of free acid in the catholyte and iron electrodeposition efficiency;

FIG. 15 is a graph showing the electro-bath for iron recovery (4 baths-2 anion exchange membrane).

DESCRIPTION OF THE PREFERRED EMBODIMENTS

EXAMPLE 1

The following example is based on the experiments carried out by the inventors. The typical chemical analysis of waste hydrochloric acid used for test is showed as follows:

| $Fe^{2+}$ | $Fe^{3+}$ | Total HCl |
|---|---|---|
| 55.8 | trace | 128.0 (Values in g/l) |

(1) The First Stage—Oxidation and Reduction

Figure 1:
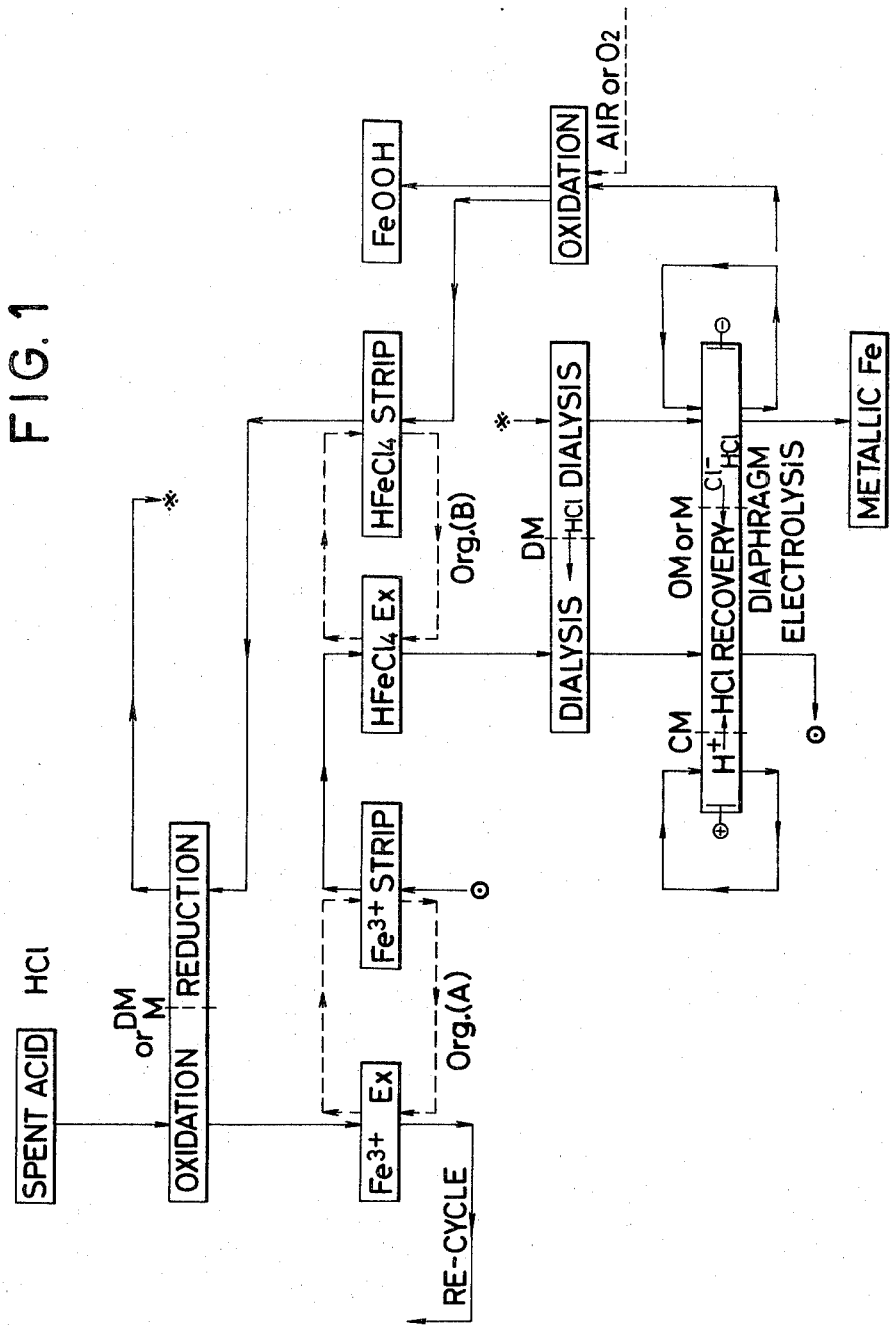
FIG. 1 shows a flow-sheet of the reusable HCl recovery from waste hydrochloric acid containing a relative little content of free acid.
Figure 2:
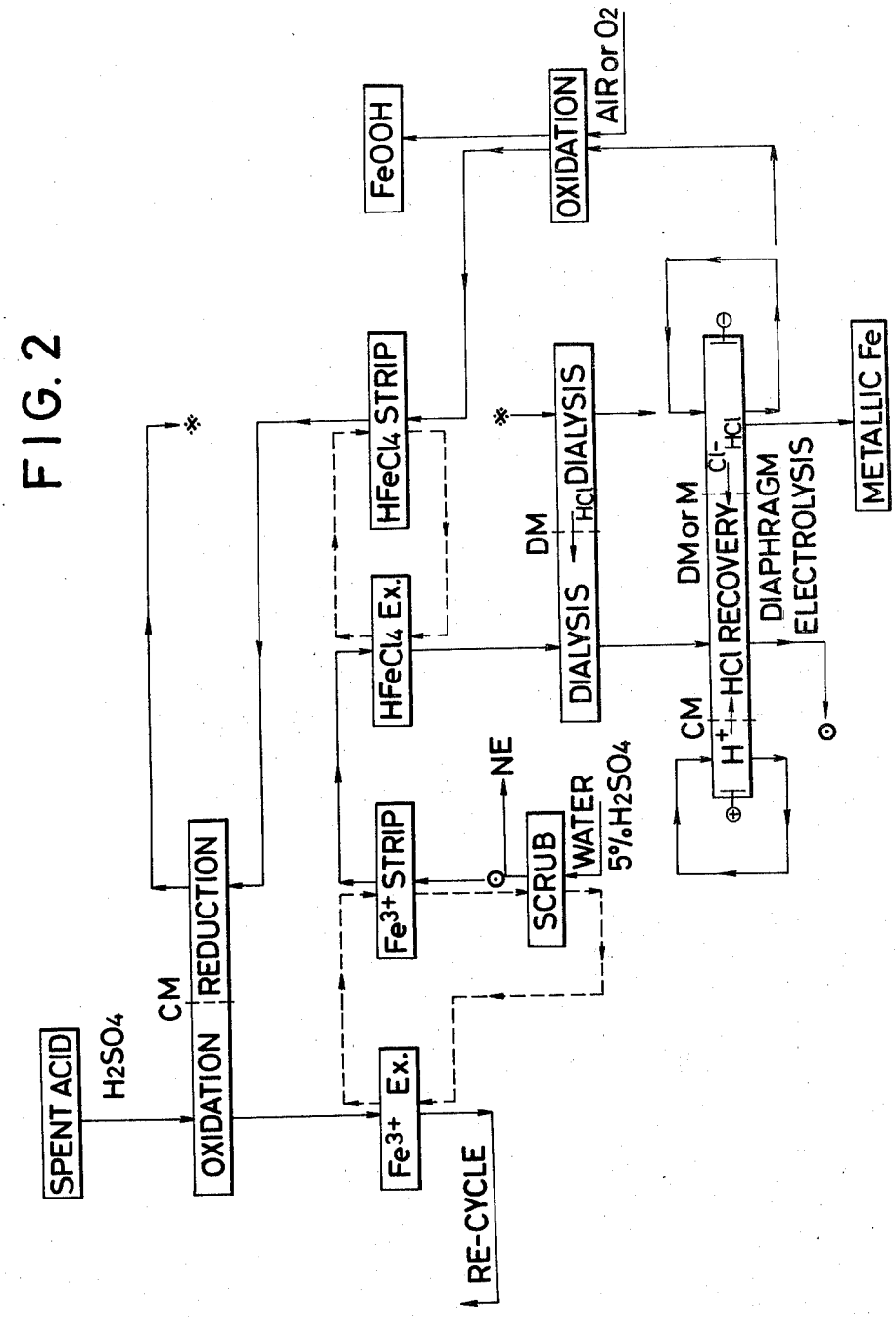
FIG. 2 shows a flow-sheet of the reusable $H_2SO_4$ recovery from waste sulphuric acid.
Figure 3:
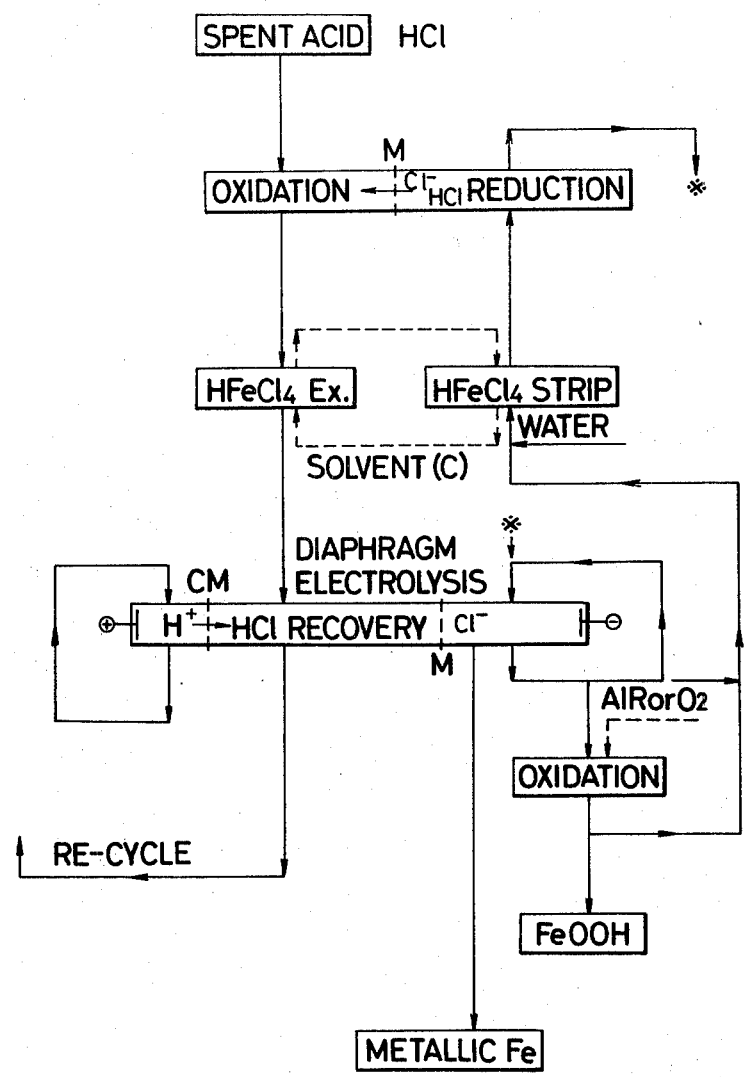
FIG. 3 shows a flow-sheet of the reusable HCl recovery from waste hydrochloric acid containing a large amounts of free acid and total $Cl^-$ ion.
Figure 4:
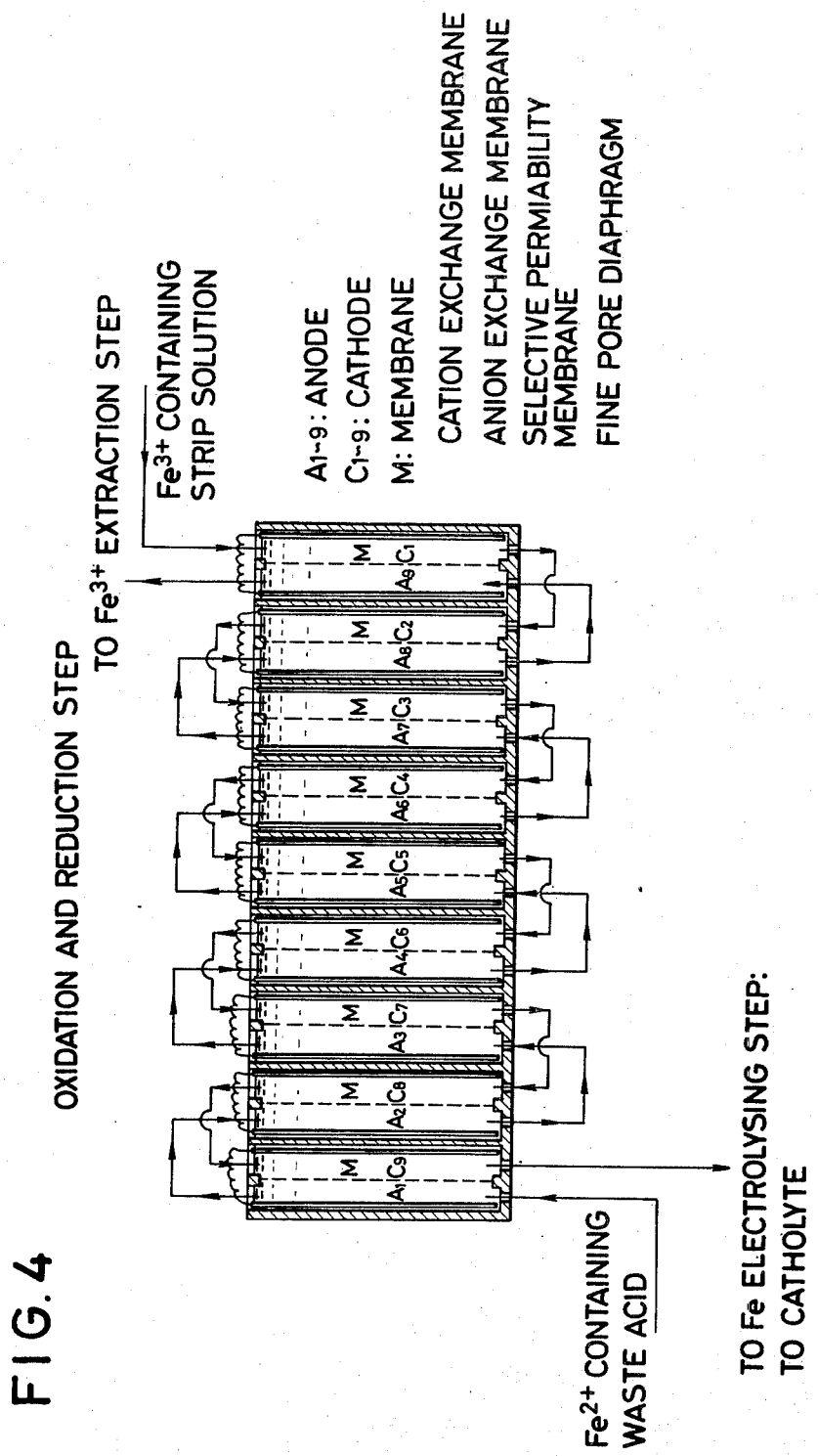
FIG. 4 is a graph showing the oxidation-reduction process in the diaphragm-electrolysis process.

The anode compartment divided with diaphragm is continuously fed with the waste acids and while the cathode compartment is fed with the synthesized HCl solution containing $Fe^{3+}$ ions (see FIG. 4). The used diaphragms consists of tetra-fluo ethylene, polyethylene acetic cellulose, diffusion-dialysis (SELEMION-DMV, trade name, produced by Asahi Glass), cation exchange (SELEMION-CMV, trade name, produced by Asahi Glass) and anion exchange membrane (SELEMION-AMV, trade name, produced by Asahi Glass). The analogous diaphragms, e.g., PVC (poly vinyl chloride) membrane, ACIPLEX-A101 (trade name, produced by Asahi Kasei), ACIPLEX-K101 (trade name, produced by Asahi Kasei), NEPTON (trade name, produced by IONICS Corp.) and NAFION (trade name, produced by Dupont Corp.), etc, can be used.

The flow path of catholyte and anolyte in the apparatus is connected with countercurrent flow through the diaphragms and the oxidation-reduction in the each final bath of both compartments is promoted by outer cell. The used anode comprises carbon, resin-impregnated carbon, Pt-plating Ti, Ta, Nb, Rh or metal oxide-coating materials and the shape of plate, net or expanded metal can be used. The used cathode is stainless steel and the shape of its plate is conventional for the operation after iron recovery.

Table 1

| | Anode Compartment | | Cathode Compartment | |
|---|---|---|---|---|
| | Inlet | Outlet | Inlet | Outlet |
| $Fe^{2+}$ | 55.8 | 1.9 | 10.8 | 100.9 |
| $Fe^{3+}$ | | 54.1 | 90.4 | 0.3 |
| Total $Cl^-$ | 128.0 | | 268.8 | |
| Flow rate (l/hr) | 2.0 | | 1.2 | |

(Values in g/l)

Diaphragm
Material : Polyethylene
Thickness : 0.11 mm
Void percent : 38%
Hole diameter : 0.4μ
Water permeability : 0.3 ml/cm²H (30 cm H₂O)

Anode material: [ Ti-Pt plating
                  Carbon

Cathode material: [ Stainless steel
                    Mild steel (2) The second stage—The Extraction of $Fe^{3+}$ ions The $Fe^{3+}$ ions in the waste acids from the first stage are extracted into the organic phase with contact of the organic solvent (A) containing a di-alkyl phosphoric acid, such as, for example, D2EHPA (Di-2-ethyl hexyl phosphoric acid) or HDBP (Monododecyl phosphoric acid) (see, FIG. 5). The organic solvent (A) may be a mixed solvent D2EHPA and $H^+$-exchangeable solvent, such as, naphthenic acid or oxime group. The raffinate in which the $Fe^{3+}$ ion were extracted off is recycled to the using parts. The $Fe^{3+}$ ions extracted into the organic solvent (A) are stripped from the organic phase with contact of a solution containing over 80 g/l of HCl and the organic solvent (A) is regenerated as the following expression.

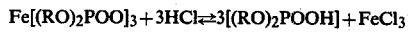

$$Fe[(RO)_2POO]_3 + 3HCl \rightleftharpoons 3[(RO)_2POOH] + FeCl_3$$

(see FIGS. 6 and 7)

(3) The Third Stage:

The enhancement of $Fe^{3+}$ ions concentration in the HCl-strip solution from the second stage is difficult as shown in FIG. 7. Moreover, since a solution of high free acid concentration is required for stripping the $Fe^{3+}$ ions from the organic solvent (A) as shown in FIG. 6, the $Fe^{3+}$ ions are unable to be stripped with water or the catholyte in the fourth stage.

An organic solvent (C) containing a phosphoric acid ester, such as, TBP, TOP, DBBP (di-butyl butyl phosphonate) or TOPO (tri octyl phosphine oxide) is selected in view of water balance in the electrolysis process and capable strip with the catholyte. Moreover, an organic solvent (C) containing a primary, secondary, tertiary or quarternary amine may be used. A further possibility is to employ as organic solvent (C) a mixture of a phosphoric acid ester and an amine. Examples of suitable amines include Primene-JMT (trade name, primary amine produced by Rohm and Haas), LA-1 (trade name, secondary amine produced by Rohm and Haas), Alamine 336 (trade name, tertiary amine produced by General Mills) and Aliquat 336 (trade name, quarternary amine produced by General Mills). The analogous phosphoric acids or amines may be used.

The iron species are extracted as ferric-chloride complex as shown in the following reactions.

FeCl₃+HCl+2TBPHFeCl₄.2TBP(extraction by TBP)

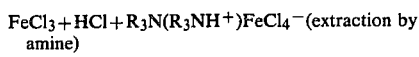

FeCl₃+HCl+R₃N(R₃NH⁺)FeCl₄⁻(extraction by amine)

(see FIG. 8)

Figure 9:
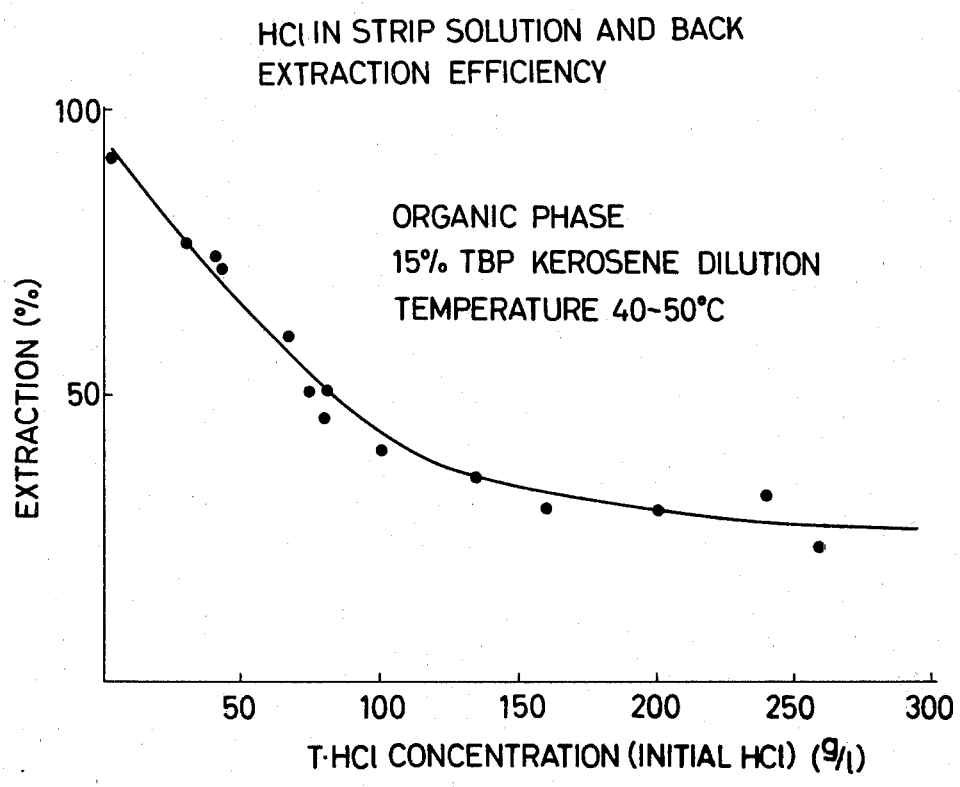
FIG. 9 is a graph showing the relation between back-extraction of $HFeCl_4$ in the organic phase and $Cl^-$ ions concentration.

As described above, the total $Cl^-$ ions concentration in the raffinate is decreased owing to the extraction of $Fe^{3+}$ ions as ferric chloride complex and consequently the raffinate can not be used for stripping in the second stage. Therefore, if necessary, the raffinate is treated by diffusion-dialysis process and introduced into the central compartment in the electro-bath for iron recovery in the fourth stage. Thus, the HCl concentration in the raffinate is increased by $H^+$ and $Cl^-$ ions obtained through the diaphragms and can be used for stripping the organic solvent (B). The ferric chloride complex extracted into the organic solvent (B) is stripped from the organic phase with contact of water or catholyte in the fourth stage. FIG. 9 shows the relation between total $Cl^-$ ions concentration in the strip solution and strip efficiency of ferric chloride complex from the organic solvent (B).

Since it is found from FIG. 9 that the catholyte in the fourth stage containing 250-300 g/l of total $Cl^-$ ions is able to strip the ferric chloride complex from the organic solvent (B) by increase of stripping stage, Fe ions can be supplied into the catholyte for iron electrolysis. However, the amount of $Cl^-$ ions transferred from the organic solvent (A) with Fe ions is 4 moles per 1 mole of Fe. While, the amount of free $Cl^-$ ions, produced by reduction of $Fe^{3+}$ ions in the oxidation-reduction cell which is constructed between the strip solution introduced into the cathode compartment in the first stage and the solution in the anode compartment contains $Fe^{2+}$ ions is 2 moles per 1 mole of Fe.

Therefore, in prior of the iron electrolysis process in the fourth stage the amount of free acid is lowered by the first stage and dialysis process and consequently the inferior efficiency of iron electrode position may be prevented with the increase of free acid as shown in FIG. 13. In the dialysis compartment $Cl^-$ ions or HCl can be transferred from the solution containing higher total $Cl^-$ ions to the one containing lower total $Cl^-$ ions using SELEMION-DMV. Both diffusion-dialysis and electro-dialysis can be adopted in the dialysis compartment.

(4) The Fourth Stage—Electrolysis for Fe Recovery

The solution from the cathode compartment in the first stage in which $Fe^{3+}$ ions are reduced to $Fe^{2+}$ ions is mixed with the solution circulating in the cathode compartment in the electro-bath for Fe recovery. As described above, when the solution from the first stage contains abundant free hydrochloric acid, if necessary, it is mixed with the catholyte after it passed through the diffusion-dialysis or electro-dialysis compartment.

Figure 10:
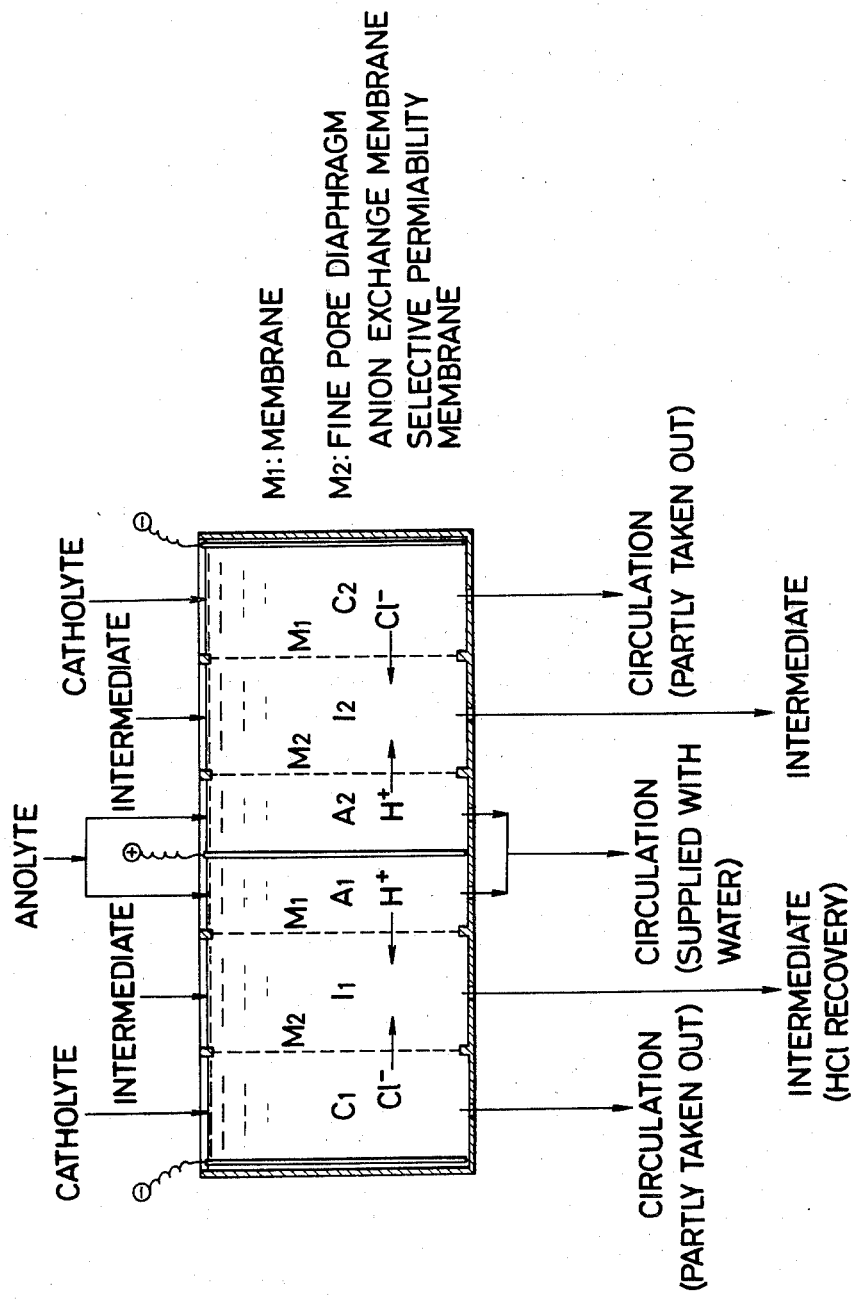
FIG. 10 is a graph showing the electro-bath for iron recovery (3 baths)
Figure 14:
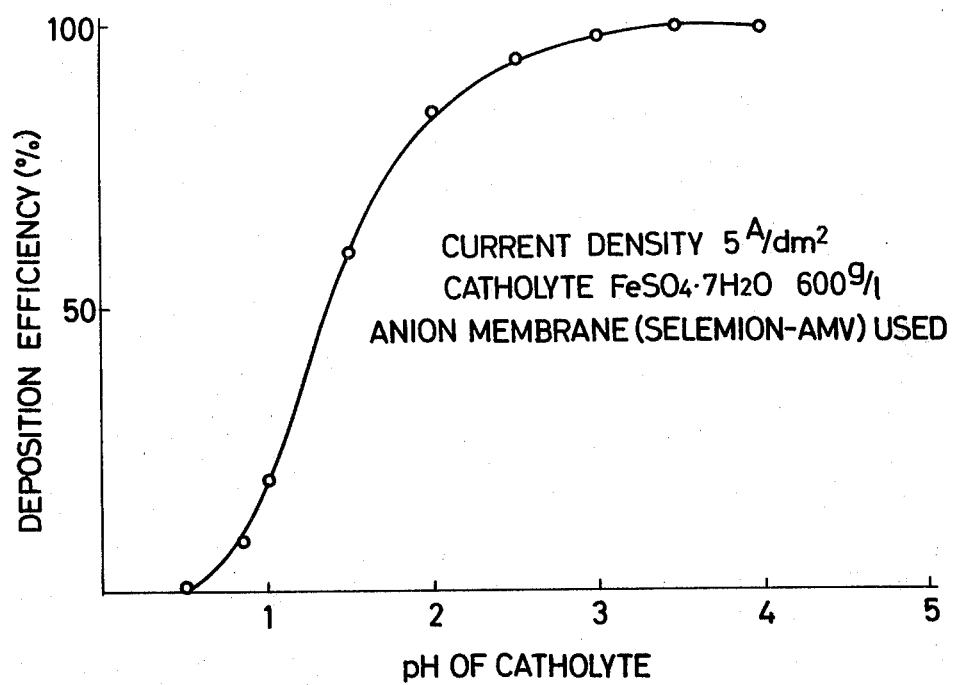
FIG. 14 is a graph showing the relation between pH value of catholyte and iron electrodeposition efficiency.

The summary of electro-bath for iron recovery is shown in FIGS. 10 and 11. 3-baths and 4-baths types were tested and the latter is favourable for the high concentration of HCl in the central compartment.

Fe ions can be recovered as iron hydroxide besides metallic iron. FeOOH produced in the oxidation of $Fe^{2+}$ ions to $Fe^{3+}$ ions with contact of air or oxygen is separated. Moreover, the $Fe^{3+}$ ions are reduced to $Fe^{2+}$ ions in the cathode compartment and free $Cl^-$ ions are transferred into the central compartment. Fe ions can be removed from the system as hydroxide form by repeating the above treatment.

The cation exchange membrane is required for the membrane between anode and central compartments in electro-bath. ACIPLEX-K101 and SELEMION-CMV were used for the test. The similar membranes having a function of selective permeability of cation, such as, NEPTON and NAFION, etc., may be used except the above membranes.

The membrane used between anode and central compartments is not necessarily an anion exchange membrane. As shown in FIG. 12, the membranes except the anion exchange membrane are superior in the transfer rate of $Cl^-$ ions produced in the electrolysis from the cathode compartment to the central compartment.

SELEMION-AMV and ACIPLEX-A101 as an anion exchange membrane were tested. SELEMION-DMV was used as a diffusion-dialysis membrane. The used fine pore diaphragms consist of tetra fluo-ethylene, acetic cellulose, polyethylene, polypropylene and poly vinyl chloride membranes. The diaphragm divided the central compartment in electrolysis of 4- baths was a fine pore diaphragm or cation exchange membrane.

The anode used is lead, Ti-Pt, Ti-Rh, Ta or Nb. The electrodes having a function of catalysis and coated with metal oxide may be used. The cathode used is steel, stainless steel or Ni plate and the shape of plate is usually used in view of after-treatment of electrolytic iron. The net type may be used. The supporting electrolyte added into the catholyte is $CaCl_2$, $NH_4Cl$, $(NH_4)_2SO_4$ or a mixed electrolyte of the above one but $CaCl_2$, $NH_4Cl$ or a mixture of $CaCl_2+NH_4Cl$ is often used in regard of the third stage. The results of electrolysis test are shown in the following table 2.

Table 2

| | Electrolysis test for iron recovery | | | | |
|---|---|---|---|---|---|
| | 1 | 2 | 3 | 4 | 5 |
| Anode material | lead | lead | Ti-Pt | Ti-Pt | lead |
| size (unit m/m) | 150 × 200 × 3 | 150 × 200 × 3 | 150 × 200 × 1 | 150 × 200 × 1 | 150 × 200 × 3 |
| number | 4 | 4 | 4 | 4 | 4 |
| Cathode material | Stainless steel | Mild steel | Stainless steel | Ni | Hastroy |
| size (unit m/m) | 150 × 200 × 3 | 150 × 200 × 3.2 | 150 × 200 × 3 | 150 × 200 × 2 | 150 × 200× 3 |
| number | 5 | 5 | 5 | 5 | 5 |
| Distaance between the electrodes | 40 | 50 | 40 | 50 | 50 |
| Diaphragm material | | | | | |
| (Anode side) | SELEMION-CMV | ACIPLEX-K101 | SELEMION-CMV | SELEMION-CMV | ACIPLEX-K101 |
| (Cathode side) | SELEMION-AHV | tetra fluo-ethylene | polyethylene | SELEMION-DMV | ACIPLEX-A101 |
| (central compartment) | polyethylene | poly vinyl chloride | | | polyethylene |
| Current density | 3.3 | 5.0 | 5.0 | 5.0 | 6.0 |

Table 2-continued

| | Electrolysis test for iron recovery | | | | |
|---|---|---|---|---|---|
| | 1 | 2 | 3 | 4 | 5 |
| (A/dM$^2$) | | | | | |
| Anolyte | 300 g/l H$_2$SO$_4$ | 200 g/l H$_2$SO$_4$ | 230 g/l H$_2$SO$_4$ | 350 g/l H$_2$SO$_4$ | 200 g/l H$_2$SO$_4$ |
| Catholyte | 1MFeCl$_2$ + 1MCaCl$_2$ | 2MFeCl$_2$ + 1MCaCl$_2$ | 1.5MFeCl$_2$ + 1MCaCl$_2$ | 1.5MFeCl$_2$ + 0.5MCaCl$_2$ + NH$_4$Cl | 2MFeCl$_2$ + 0.5MCaCl$_2$ + 0.1MNH$_4$Cl |
| Recovered HCl (Central room) | 150 g/l | 150 g/l | 120 g/l | 100 g/l | 120 g/l |
| Metallic Fe(g/m) | 72.4 | 108 | 114 | 115 | 118 |

Table 3

| | Chemical analysis of recovered electrolytic iron | | | | | | | | | | | | | |
|---|---|---|---|---|---|---|---|---|---|---|---|---|---|---|
| | As | Sb | Mn | Pb | Sn | Mg | Si | Cr | Co | Ni | Al | Ca | Cu | Cd | Zn |
| Electrolysis 1 | 0 | 0 | 0 | 4 | 0 | 0 | 1 | 1 | 1 | 0 | 0 | 0 | 4 | 0 | 4 |
| Electrolysis 2 | 0 | 0 | 0 | 4 | 0 | 0 | 1 | 1 | 0 | 0 | 0 | 2 | 0 | 4 |
| Electrolysis 3 | 0 | 0 | 1 | 0 | 0 | 1 | 0 | 1 | 1 | 0 | 0 | 0 | 2 | 0 | 0 |
| Electrolysis 4 | 0 | 0 | 0 | 0 | 0 | 0 | 1 | 1 | 4 | 0 | 0 | 0 | 4 | 0 | 1 |
| Electrolysis 5 | 0 | 0 | 0 | 1 | 0 | 1 | 1 | 1 | 1 | 0 | 0 | 0 | 4 | 0 | 4 |

$^0$invisible
$^1$extremely faint visible
$^2$faintly visible
$^3$faintly intense visible
$^4$intensely visible
$^5$extremely intense visible

EXAMPLE 2

The chemical analysis of waste acid discharged in the production of TiO$_2$ is shown in the following table and the above waste acid was used for the test.

| H$_2$SO$_4$ | Total Fe | Ti | |
|---|---|---|---|
| 287.8 | 28.1 | 7.4 | (Values in g/l) |

The waste acid contains a little amount of Al, V, Mn and Mg ions besides the said chemical species.

(1) The First Stage—The Oxidation of Fe$^{2+}$ ions

The waste acid is introduced into the anode compartment due to the oxidation and the HCl solution containing Fe$^{3+}$ ions is introduced into the cathode compartment divided with diaphragm. The oxidation-reduction cell is constructed by connecting cathode and anode set in the both compartments with wire. Fe$^{2+}$ ions in the anode compartment are oxidized to Fe$^{3+}$ ions and Fe$^{3+}$ ions in the cathode compartment are reduced to Fe$^{2+}$ ions.

The used diaphragm is the cation exchange membrane in order to prevent Cl$^-$ ions. SELEMION-CMV and ACIPLEX-K101 were used for the test but the analogous cation exchange membrane, such as, NEPTON and NAFION, etc., may be used.

Table 4

| | Anode compartment | | Cathode compartment | |
|---|---|---|---|---|
| | Inlet | Outlet | Inlet | Outlet |
| Fe$^{2+}$ | 28.1 | <0.1 | — | 76.7 |
| Fe$^{3+}$ | <0.01 | 28.1 | 76.8 | <0.1 |
| HCl or H$_2$SO$_4$ | 287.8 | 287.8 | 198.1 | 198.1 |
| Flow rate (l/hr) | 0.58 | | 0.21 | |
| | (Values in g/l) | | | |

Diaphram ACIPLEX-A101
Anode: Carbon, Cathode: Steel

In the above test, the each final compartment of anode and cathode compartments are divided with the diaphragms and connected to an outer cell. The analogous membranes having a function of selective permeability of cation besides the above membranes may be utilized. Furthermore, the use together with a fine pore membrane is able to prevent the transfer of anion and the degradation of cation exchange membrane by Cl$_2$ gas.

(2) The Second Stage—The Extraction of Fe$^{3+}$ ions

The Fe$^{3+}$ ions contained in the solution from the anode compartment in the first stage are extracted into the organic phase with contact of an organic solvent (A) containing a di-alkyl phosphoric acid, such as, D2EHPA or HDBP.

The resultant Fe$^{3+}$ ion free aqueous solution is regenerated and recycled to the using part. However, in the production of TiO$_2$ the H$_2$SO$_4$ concentration in the resultant solution is concentrated to 70–90% by the concentration process and reused to dissolve raw materials. The Fe$^{3+}$ ions extracted into the organic solvent (A) are stripped from the organic phase by contact with HCl and then the Ti ions in the organic phase can be stripped by contact with (NH$_4$)$_2$CO$_3$+NH$_3$ solution.

Since the organic solvent (A) after the stripping of Ti ions is converted to the NH$_4$-type, it is converted back to the H-type by contact with H$_2$SO$_4$ and reused to extract the Fe$^{3+}$ ions. When the Ti ions are not present, the Fe$^{3+}$ ions are stripped by contact with HCl and reused to extract the Fe$^{3+}$ ions after washing with water or 1–5% of H$_2$SO$_4$ solution.

The third and fourth stages are omitted due to the same as those of the example 1.

EXAMPLE 3

The waste acid discharged in the production of steel wire, such as, piano wire, by lead patenting method was used for the test. Its chemical composition is shown as follows.

| Fe$^{2+}$ | Pb | Zn | Total H$_2$SO$_4$ |
|---|---|---|---|
| 47.8 | 2.1 | 0.4 | 157.4 |
| | | (Values in g/l) | |

(1) The First Stage—The Oxidation of Fe$^{2+}$ ions

The above solution is introduced into the anode compartment divided with diaphragm and the cathode compartment is filled with a solution containing $Fe^{3+}$ ions. The oxidation-reduction cell is constructed by connecting a carbon or metal electrode set in both compartments. The $Fe^{2+}$ ions in the anode compartment are oxidized to $Fe^{3+}$ ions, while the $Fe^{3+}$ ions in the cathode compartment are reduced to $Fe^{2+}$ ions.

An outer cell is connected in order to promote the reduction of $Fe^{3+}$ ions in the cathode compartment to $Fe^{2+}$ ions and accomplish the oxidation of $Fe^{2+}$ ions by continuous countercurrent. The rate of conversion is enhanced and the free HCl in the catholyte is transferred into the anode compartment.

Table 5

|  | Anode room | | Cathode room | |
| --- | --- | --- | --- | --- |
|  | Inlet | Outlet | Inlet | Outlet |
| $Fe^{2+}$ | 47.8 | <0.1 | 12.4 | 93.5 |
| $Fe^{3+}$ | — | 47.8 | 81.5 | 0.4 |
| Total HCl | 157.4 | 262.4 | 266.3 | 161.3 |
| Flow rate (l/hr) | 2.0 | | 1.2 | |
| | (Values in g/l) | | | |

Diaphragm SELEMION-DMV
Anode: Carbon, Cathode: SUS-304 Steel

Ti-Pt, Ti-Rh and Ta electrodes besides carbon electrode may be used as anode. Mild steel and Ni electrodes can be used as cathode. The shapes of used electrode are plate, net and expand.

The used diaphragm is an anion exchange membrane, such as, SELEMION-AMV, NEPTON or an ordinary fine pore diaphragm besides a diffusion-dialysis membrane. Tetra fluo-ethylene, poly vinyl chloride, polyethylene or acetic cellulose membranes was used for the test. The analogous diaphragms may be used.

This example is different from examples 1 or 2. In the present example, the best diaphragm is a diffusion-dialysis membrane, such as, SELEMION-DMV with the object of transferring HCl, present at the same time of the reduction of $Fe^{3+}$ ions in the first stage, into the anode compartment. The analogous dialysis membranes having the same function may be used.

It is found from FIG. 13 that the electro-deposition efficiency of iron favourably increases as the concentration of free HCl in the solution from the cathode compartment decreases.

(2) The Second Stage—The Extraction of $Fe^{3+}$ ions ferric Chloride Complex

The total $Cl^-$ ions concentration in the waste acid in which $Fe^{2+}$ ions are converted to $Fe^{3+}$ ions in the first stage is raised by $Cl^-$ ions and HCl transferred from the cathode compartment. The $Fe^{3+}$ ions in the resultant waste acid are extracted as ferric chloride complex into the organic phase with contact of an organic solvent (C), such as, a phosphoric acid ester or a mixed solvent of amines selected from a primary, secondary, tertiary or quarternary amine group.

TBP, TOP, DBBP or TOPO as a phosphoric acid ester was used. Primene JMT (a primary amine), LA-1 (a secondary amine), Alamine 336 (a tertiary amine) or Aliquat 336 (a quarternary amine) as an amine was used. The analogous phosphoric acid esters or amines may be used.

The raffinate from the second stage has the following chemical composition.

| $Fe^{2+}$ | $Fe^{3+}$ | Total $Cl^-$ |
| --- | --- | --- |
| 0.1 | trace | 139.1 |
| | (Values in g/l) | |

The ferric chloride complex extracted into the organic solvent (C) is stripped from the organic phase with contact of water or the catholyte in the fourth stage and the organic solvent (C) is regenerated. The said strip solution in which the $Fe^{3+}$ ions were increased is supplied to the cathode compartment in the first stage. The oxidation-reduction cell is constructed between the above solution in the cathode compartment and the waste acid containing $Fe^{2+}$ ions in the anode compartment divided with diaphragm. After the reduction of $Fe^{3+}$ ions to $Fe^{2+}$ ions, the resultant solution is mixed with the catholyte circulating in the electro-bath for iron recovery in the third stage.

(3) The Third Stage

In the case of increasing the concentration of recovered HCl in the central compartment of electro-bath for iron recovery it is unable to completely prevent that the $Cl^-$ ions mix to the anode compartment by means of the selective character of cation exchange membrane used in the anode compartment side. Therefore, the used anode materials are limited.

As shown in FIG. 15, it was capable to prevent that the $Cl^-$ ions enter to the anode compartment by enhancement of number of compartment using cation exchange or diffusion-dialysis membrane.

The catholyte containing 100 g/l of $Fe^{2+}$, 40 g/l of Ca and 195 g/l of total $Cl^-$ and having pH value of 3.8 is drawn off and oxidized for 6 hrs. with $O_2$ gas at 60° C.

The chemical composition of filtrate after aging is shown as follows.

| $Fe^{2+}$ | $Fe^{3+}$ | Ca | Total $Cl^-$ |
| --- | --- | --- | --- |
| 28.8 | 47.4 | 40 | 194 |
| | (Values in g/l) | | |

The said solution is recycled to strip the ferric chloride complex extracted in the organic solvent (C) or mixed with the catholyte in electro-bath for iron recovery to reduce $Fe^{3+}$ ions and transferred free acid produced in the reduction process to the central compartment through diaphragm. In repeating the above operation, Fe ions can be fixed in the form of hydroxide without the reduction until metallic iron. The iron hydroxide obtained in this process is high-purity and may be used for ferrite or pigment by further purification.

Table 6

| | Electrolysis test for iron recovery | | |
| --- | --- | --- | --- |
| | 3-(1) | 3-(2) | 3-(3) |
| Anode material | lead | lead | Ti-Pt |
| size | 150 × 200 × 3 | 150 × 200 × 3 | 150 × 200 × 2 |
| number | 4 | 4 | 4 |
| Cathode material | Stainless steel | Mild steel | Stainless steel |
| size | 150 × 200 × 3 | 150 × 200 × 3.2 | 150 × 200 × 3 |
| number | 5 | 5 | 5 |

Table 6-continued

| | Electrolysis test for iron recovery | | |
|---|---|---|---|
| | 3-(1) | 3-(2) | 3-(3) |
| Compartment | 4 | 5 | 5 |
| Diaphragm material | | | |
| (Anode side) MA | SELEMION-CMV | ACIPLEX-K101 | ACIPLEX-K101 |
| (Cathode side) MC | SELEMION-DMV | tetra fluo-ethylene | SELEMION-DMV |
| (Central compartment 1) $MI_1$ | polyethylene | ACIPLEX-K101 | ACIPLEX-K101 |
| (Central compartment 2) $MI_2$ | | polyethylene | SELEMION-DMV |
| Current density (A/$DM^2$) | 5.0 | 5.0 | 6.0 |
| Anolyte (A) | 200 g/l $H_2SO_4$ | 200 g/l $H_2SO_4$ | 200 g/l $H_2SO_4$ |
| Catholyte (C) | 1.5M$FeCl_2$ + 1M$CaCl_2$ | 1.5M$FeCl_3$ + 1M$CaCl_2$ | 1.5M$FeCl_2$ + 1M$CaCl_2$ |
| Central room (Recovered) $I_2$ | 150 g/l HCl | 150 g/l HCl | 150 g/l HCl |
| Central room (Anode side) $I_1$ | | 200 g/l $H_2SO_4$ | 200 g/l $H_2SO_4$ |
| Anode $Cl^-$ ion | 580 ppm. | 8 ppm. | 5.4 ppm. |

What is claimed is:

1. A process for the recovery of waste HCl from an aqueous metal pickling solution which contains large amounts of Fe ions comprising:
   1. converting the $Fe^{2+}$ ions in the waste to $Fe^{3+}$ ions;
   2. extracting the $Fe^{3+}$ ions from the converted solution from step 1 with an organic solvent C to form an $FeCl_3$-complex therein and to produce an aqueous raffinate;
   3. regenerating solvent C by contacting it with an aqueous extractant to extract the $Fe^{3+}$ therefrom;
   4. subjecting the raffinate from step 2 to diaphragm electrolysis to recover HCl therefrom.

2. The process of claim 1 wherein the conversion step (1) is carried out in an oxidation-reduction cell wherein the waste solution is the anolyte and the catholyte is an HCl solution containing $Fe^{3+}$ ions, the used catholyte thus containing $Fe^{2+}$ ions.

3. The process of claim 2 wherein the $Fe^{3+}$ containing extractant from step (3) is used as the catholyte in step (1).

4. The process of claim 2 wherein the ion values in the used catholyte from step (1) are recovered by diaphragm electrolysis.

5. The process of claim 1 in which organic solvent C is a phosphoric acid ester or amine together with a petroleum hydrocarbon as a diluent.

6. The process of claim 5 in which organic solvent C is tributyl phosphate, trioctyl phosphate, dibutyl butyl phosphonate or tri-octyl phosphine oxide.

7. The process of claim 5 in which organic solvent C contains a primary, secondary, tertiary or quaternary amine, together with 5-15% of a higher alcohol as a modifier.

8. The process of claim 7 in which the higher alcohol is one having 8 to 15 carbons.

9. The process of claim 5 in which organic solvent C is a mixture of tributyl phosphate and a secondary amine or tertiary amine.

10. The process of claim 4 wherein the cell used for the diaphragm electrolysis of the used catholyte has an anode compartment, a cathode compartment and a central compartment therebetween which is separated from the anode and cathode compartments by first and second diaphragms, respectively, and wherein the central compartment is divided into four subcompartments each containing HCl, the concentration of HCl being different from one compartment to the next and the solutions are circulated in each compartment.

11. The process of claim 2 wherein the first and second diaphragms are a cation exchange membrane or fine pore diaphragm.

12. The process of claim 10 wherein a portion of the solution in the cathode compartment is drawn off and oxidized with air to produce iron hydroxide which is then filtered off and the filtrate is recycled to the cathode compartment or is used as the extractant in step (2).

* * * * *